United States Patent
Harada

(10) Patent No.: US 10,242,478 B2
(45) Date of Patent: Mar. 26, 2019

(54) SYSTEM, METHOD, AND PROGRAM FOR MANAGING AVATARS

(71) Applicant: DeNA Co., Ltd., Shibuya-ku, Tokyo (JP)

(72) Inventor: Kota Harada, Tokyo (JP)

(73) Assignee: DENA CO., LTD., Tokyo (JP)

( * ) Notice: Subject to any disclaimer, the term of this patent is extended or adjusted under 35 U.S.C. 154(b) by 0 days.

(21) Appl. No.: 15/889,015

(22) Filed: Feb. 5, 2018

(65) Prior Publication Data
US 2018/0225853 A1 Aug. 9, 2018

(30) Foreign Application Priority Data
Feb. 3, 2017 (JP) .................. 2017-019107

(51) Int. Cl.
*G06T 11/60* (2006.01)
*G06F 3/0484* (2013.01)
*G06F 3/0482* (2013.01)

(52) U.S. Cl.
CPC ............ *G06T 11/60* (2013.01); *G06F 3/0482* (2013.01); *G06F 3/04845* (2013.01)

(58) Field of Classification Search
None
See application file for complete search history.

(56) References Cited

U.S. PATENT DOCUMENTS

2007/0021213 A1  1/2007  Foe et al.

FOREIGN PATENT DOCUMENTS

| JP | 2007328389 A | 12/2007 |
|---|---|---|
| JP | 2008217142 A | 9/2008 |
| JP | 2008543474 A | 12/2008 |
| JP | 2010003203 A | 1/2010 |
| JP | 2010067240 A | 3/2010 |
| JP | 2012018569 A | 1/2012 |
| JP | 2013509205 A | 3/2013 |
| WO | 2009146250 A1 | 12/2009 |

OTHER PUBLICATIONS

Office Action for Japanese Patent Application No. 2017-139737 dated Nov. 14, 2017; 5 pages. English translation provided.
Office Action for related Japanese Patent Application No. 2017-139737, dated Apr. 5, 2018, English translation provided; 4 pages.

*Primary Examiner* — Michelle Chin
(74) *Attorney, Agent, or Firm* — Procopio, Cory, Hargreaves & Savitch LLP

(57) ABSTRACT

The avatar management system pertaining to an embodiment has a function of managing the avatars of each of a plurality of users, and provides the users with a service such as SNS using these avatars, via user terminals. This system is configured so that avatars are displayed in a display mode based on items that have been applied, but the display mode of the avatars changes according to the value of a specific parameter based on at least the actions of other users.

18 Claims, 8 Drawing Sheets

User management table 411

| User ID |
| --- |
| User basic information |
| Avatar information |
| Possessed item information |
| Familiarity information |
| Prediction information |
| ... |

Parameter management table 412

| Special item ID |
| --- |
| Number of provisions |
| ... |

SYSTEM, METHOD, AND PROGRAM FOR MANAGING AVATARS

CROSS REFERENCE TO RELATED APPLICATIONS

This application claims foreign priority under 35 USC 119 based on Japanese Patent Application No. 2017-019107, filed on Feb. 3, 2017, the contents of which is incorporated herein in its entirety by reference.

BACKGROUND

1. Technical Field

The present invention relates to a system, a method, and a program (e.g., non-transitory computer readable medium having instructions for performing managing the avatars of each of a plurality of users), for managing the avatars of each of a plurality of users.

2. Related Art

Conventionally, services such as SNS make use of avatars, which are characters representing the users' own identities. Typically, the display mode of such an avatar changes according to the application of items such as costumes by the user. Regarding changes to the display mode of an avatar, Patent Document 1 (see below) discloses a technique for automatically updating an avatar so as to indicate the current status of a user on the basis of sensor data from a sensor connected to the user's mobile device.

PRIOR ART DOCUMENTS

[Patent Document]
Patent Document 1: Published Japanese Translation of PCT International Application No. 2011-523486

SUMMARY

Problems to be Solved by the Invention

However, with the conventional avatar mentioned above, although the display mode changes according to the application of items by the user and the current status of the user, etc., the changes are limited to those directly attributable to the user's action, and this can sometimes become uninteresting for the user. The loss of interest in the avatar that can occur as a result may lead to less lively communication via the avatar, and to making the service, such as SNS, less sociable.

One of the objectives of an embodiment of the present invention is to help prevent users from losing interest in their avatars. Other objects of an embodiment of the present invention will become apparent through reference to this Description in its entirety.

Means for Solving the Problems

The system pertaining to an embodiment of the present invention is a system for managing the avatars of each of a plurality of users, comprising one or more computer processors, wherein the one or more computer processors, in response to the execution of a readable command, execute processing to apply an item selected from among items possessed by the user to the user's avatar, processing to display the avatar in a display mode based on at least the item that has been applied, and processing to update a specific parameter based on at least the actions of other users, and the processing to display the avatar includes changing the display mode of the avatar according to the value of the specific parameter.

The method pertaining to an embodiment of the present invention is executed by one or more computers and is a method for managing the avatars of each of a plurality of users, said method comprising the steps of applying an item selected from among the items possessed by the user to the user's avatar, displaying the avatar in a display mode based on at least the item that has been applied, and updating a specific parameter based on at least the actions of other users, wherein the step of displaying the avatar includes changing the display mode of the avatar according to the value of the specific parameter.

The program pertaining to an embodiment of the present invention is a program for managing the avatars of each of a plurality of users (e.g., non-transitory computer readable medium having instructions for performing managing the avatars of each of a plurality of users), wherein, when this program is executed by one or more computers, it causes the one or more computers to execute processing to apply an item selected from among the items possessed by the user to the user's avatar, processing to display the avatar in a display mode based on at least the item that has been applied, and processing to update a specific parameter based on at least the actions of other users, and the processing to display the avatar includes changing the display mode of the avatar according to the value of the specific parameter.

Effects of the Invention

Various embodiments of the present invention help prevent users from losing interest in their avatars.

DETAILED DESCRIPTION

Embodiments of the present invention will now be described through reference to the drawings.

Figure 1:
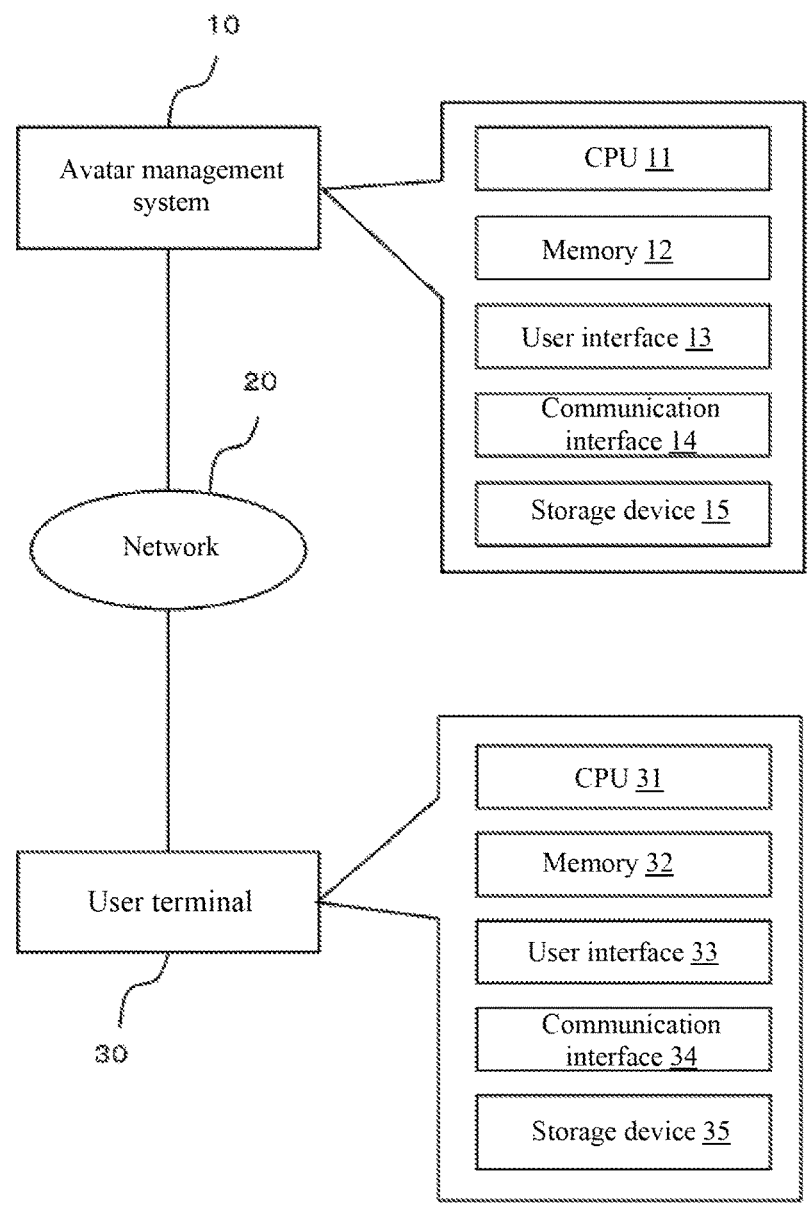
FIG. 1 A configuration diagram showing the simplified configuration of a network including an avatar management system 10 pertaining to an embodiment of the present invention.

FIG. 1 is a configuration diagram showing the simplified configuration of a network that includes an avatar management system 10 pertaining to an embodiment of the present invention. As shown in FIG. 1, the system 10 is communicably connected to a user terminal 30 via a network 20 such as the Internet. Only one user terminal 30 is shown in FIG. 1, but the system 10 is connected so as to be able to communicate with a plurality of user terminals 30. The system 10 has a function of managing the avatars of each of a plurality of users, and provides users with a service such as SNS using the avatars via the user terminals 30.

The system 10 is configured as an ordinary computer, and comprises a CPU (computer processor) 11, a main memory 12, a user interface 13, a communication interface 14, and a storage (memory) device 15. These constituent elements are electrically connected via a bus (not shown) or the like.

The CPU 11 reads various programs (e.g., non-transitory computer readable medium having instructions for performing managing the avatars of each of a plurality of users) stored in the storage device 15 or the like into the main memory 12 and executes various commands included in the programs. The main memory 12 is constituted by a DRAM, for example.

The user interface 13 includes various input/output devices for exchanging information with the user. The user interface 13 includes, for example, an information input device such as a keyboard or a pointing device (such as a mouse or a touch panel), a voice input device such as a microphone, and an image input device such as a camera. The user interface 13 also includes an image output device such as a display and an audio output device such as a speaker.

The communication interface 14 is in the form of hardware such as a network adapter, any of various kinds of communication software, or a combination thereof, and is configured to allow wired or wireless communication via the network 20 or the like.

The storage device 15 is constituted, for example, by a magnetic disk, a flash memory, or the like. The storage device 15 stores various programs including an operating system, various data, and the like (e.g., non-transitory computer readable medium having instructions for performing managing the avatars of each of a plurality of users).

In this embodiment, the system 10 can be configured using a plurality of computers each having the above-mentioned hardware configuration. For instance, the system 10 may be constituted by a plurality of server devices.

The avatar management system 10 thus configured functions as a web server and an application server, executes various kinds of processing in response to requests from the web browsers installed in the user terminals 30 or other applications, and transmits screen data (such as HTML data), control data, and so forth according to the results of this processing to the user terminals 30. At the user terminals 30, a web page or other screen based on the received data is displayed.

The user terminal 30 is configured as an ordinary computer, and as shown in FIG. 1, comprises a CPU (computer processor) 31, a main memory 32, a user interface 33, a communication interface 34, and a storage (memory) device 35. These constituent elements are electrically connected via a bus (not shown) or the like.

The CPU 31 reads the various programs stored in the storage device 35 or the like into the main memory 32, and executes various commands included in the programs (e.g., non-transitory computer readable medium having instructions for performing managing the avatars of each of a plurality of users). The main memory 32 is constituted by a DRAM, for example.

The user interface 33 is various input/output devices for exchanging information with the user. The user interface 33 includes, for example, an information input device such as a keyboard or a pointing device (such as a mouse or a touch panel), a voice input device such as a microphone, and an image input device such as a camera. The user interface 33 also includes an image output device such as a display, and an audio output device such as a speaker.

The communication interface 34 is in the form of hardware such as a network adapter, any of various kinds of communication software, or a combination thereof, and is configured to allow wired or wireless communication via the network 20 or the like.

The storage device 35 is constituted by, for example, a magnetic disk, a flash memory, or the like. The storage device 35 stores various programs including an operating system, various data, and the like (e.g., non-transitory computer readable medium having instructions for performing managing the avatars of each of a plurality of users). The programs stored in the storage device 35 can be downloaded and installed from an application market or the like.

In this embodiment, the user terminal 30 can be configured as a smart phone, a tablet terminal, a wearable device, a personal computer, a dedicated game terminal, or the like.

Figures 2, 3:
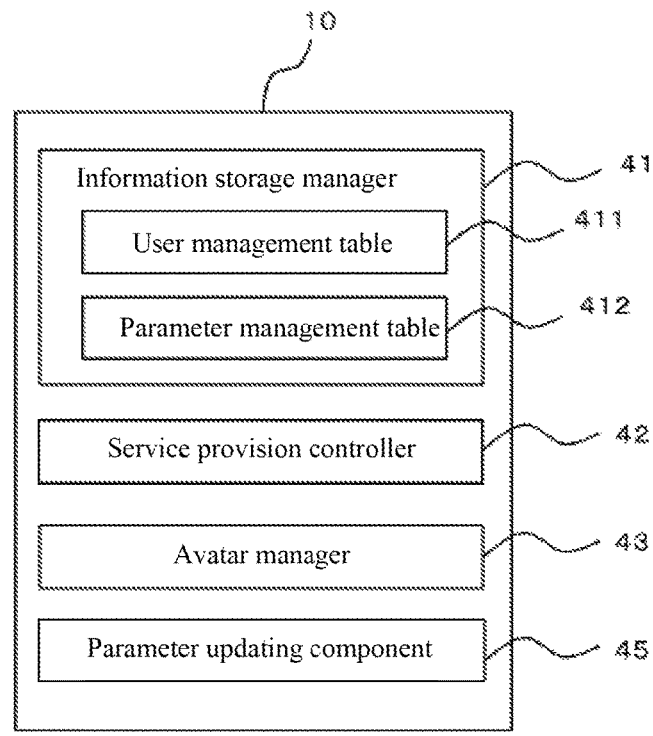
FIG. 2 A simplified block diagram showing the functions of the avatar management system 10.
FIG. 3 An example of the information managed by a user management table 411.

Next, the functions of the avatar management system 10 in this embodiment will be described. FIG. 2 is a simplified block diagram showing the functions of the system 10. As shown in the drawing, the system 10 has an information storage manager 41 for storing and managing various information, a service provision controller 42 for controlling the provision of services (such as SNS) involving the use of avatars, an avatar manager 43 for managing the avatars of each of a plurality of users, and a parameter updating component 45 for updating a specific parameter based on at least the actions of other users. These functions are realized by the cooperative operation of the hardware such as the CPU 11 and the main memory 12 and the various programs (e.g., non-transitory computer readable medium having instructions for performing managing the avatars of each of a plurality of users) and data stored in the storage device 15, etc., and the CPU 11 executes commands included in the programs that have been read into the main memory 12, for example. Some or all of the functions shown in FIG. 2 can be realized by cooperation between the system 10 and the user terminals 30, or can be realized by just the user terminals 30.

The information storage manager 41 of the system 10 stores and manages the various information in the storage device 15, etc. For example, as shown in FIG. 2, the information storage manager 41 has a user management table 411 for managing information about users and a parameter management table 412 for managing information about specific parameters.

The service provision controller 42 of the system 10 executes various processing related to the control of the provision of services such as SNS. For example, the service provision controller 42 transmits control data or HTML data of various screens for providing this service to the user terminals 30, executes various processing in response to user input via these screens displayed on the user terminals 30, and transmits control data or HTML data according to the results of the processing to the user terminals 30.

An avatar manager 43 of the system 10 executes various processing related to the management of avatars. For example, the avatar manager 43 transmits control data or HTML data of various screens related to avatar management to the user terminals 30, executes various processing in response to user input via the screens displayed on the user terminals 30, and transmits control data or HTML data according to the results of the processing to the user terminals 30.

In this embodiment, the avatar manager 43 is configured so that an item selected from the items possessed by the user is applied to the avatar of that user. For example, in response to a request from the user, the avatar manager 43 presents the user with a screen for applying an item to the avatar (for example, screen data for a screen is transmitted to the user terminal 30), and the item selected by the user via this screen is applied to the avatar of the user. Information related to the items possessed by the user and to the item applied to the avatar is managed in the user management table 411, for example.

In addition, the avatar manager 43 is configured so that the avatar is displayed in a display mode based on at least the item that has been applied, and the display mode changes according to the value of the specific parameter. For example, the avatar manager 43 is configured such that, in response to a request from the user, the user is presented with a screen that displays the avatar (for example, screen data for that screen, etc., is sent to the user terminal 30), and the display mode of the avatar changes according to the value of the specific parameter.

The parameter updating component 45 of the system 10 executes various processing related to the updating of specific parameters. For example, the parameter updating component 45 updates a specific parameter according to particular actions of each of a plurality of users in a service such as SNS. The value of the specific parameter is managed in the user management table 411 or the parameter management table 412, for example.

Thus, the avatar management system 10 in this embodiment displays the avatar in the display mode based on the item that has been applied, but changes the display mode of the avatar according to the value of a specific parameter based on at least the actions of other users, so this helps prevent users from losing interest in the avatar compared to when the display mode changes only in response to an action by the user himself (such as applying an item). Changes in the display mode of the avatar include, but are not limited to, changes in some or all of its appearance, changes in some or all of the foreground or background, changes in motion, whether or not there are visual effects, and the like.

In this embodiment, the specific parameters may include various parameters based on at least the actions of other users. For example, the specific parameter is a parameter based on at least the actions of other users with respect to a special item, and in this case, if the user has applied that special item to his avatar, the avatar manager 43 is configured so as to change the display mode of the avatar according to the value of the specific parameter. Changes in the display mode of the avatar include a change to the display mode of a special item applied to that avatar.

Specific parameters include the number of provisions of a special item to a plurality of users, or the number of users who possess that special item. In this case, the parameter updating component 45 can be configured so that the specific parameter (the number of provisions of a special item or the number of users possessing that item) is updated according to the provision of a special item to each of a plurality of users (the acquisition of a special item by each of a plurality of users). The provision of a special item is not limited to these, but is performed, for example, by a lottery ("gacha"), is performed as a reward for the achievement of a particular mission, etc., and/or is performed in response to a purchase using a virtual currency or the like. For instance, when the user applies a special item to his avatar, the avatar manager 43 changes the display mode of the avatar to reflect that the number of provisions of a special item or the number of users possessing that item has reached a specific value. Such a configuration may encourage the users to apply the same item to an avatar, and can improve social connectivity in services such as SNS.

Also, specific parameters include the number of users who have applied a special item to an avatar. In this case, the parameter updating component 45 can be configured to update a specific parameter (the number of users who have applied a special item) according to the application of a special item by each of a plurality of users to an avatar, and the cancellation of the same. For instance, when the user has applied a special item to an avatar, the avatar manager 43 changes the display mode of the avatar to reflect that the number of users who have applied that special item has reached a specific value. Such a configuration may encourage the users to apply the same item to an avatar, and can improve social connectivity in services such as SNS.

In this embodiment, the specific parameter is the number of users who executed a particular action, for example. In this case, the avatar manager 43 is configured so that when the user is executing a particular action, the display mode of the avatar changes according to the number of users who have executed that particular action. A particular action is, for example, an action executed on a service where avatars are used. In this case, the parameter updating component 45 can be configured to update a specific parameter (the number of users who have executed a particular action) in response to the execution of a particular action by each of a plurality of users. For example, when the user is executing a particular action, the avatar manager 43 changes the display mode of the avatar to reflect that the number of users who have executed that particular action has reached a specific value. With this configuration, since the display mode of the avatar changes according to the number of users who have executed a particular action, this encourages the users to perform the same action, and can improve social connectivity in services such as SNS.

In this embodiment, the service provision controller 42 can be configured to accept a prediction from the user for a particular event and determine whether or not the prediction received from the user is correct, in which case the above-mentioned particular action includes this prediction about a particular event. That is, the specific parameters include the number of users who made the same prediction. Particular events that are predicted include, but are not limited to, weather and the winning or losing of a particular game (such as a professional sports game). Also, in this case, if the user is making a particular prediction (such as "the weather tomorrow will be sunny"), for example, the avatar manager 43 is configured to change the display mode of the avatar according to the number of users making the same prediction. For example, the display mode of the avatar changes to reflect that this number of users has reached a specific value. Also, the avatar manager 43 can be configured so that when the user's prediction about a particular event is correct, the display mode of the avatar changes according to the number of users who made the same prediction (that is, the number of users whose prediction about a particular event was correct), but the display mode of the avatar does not change if the user's prediction is incorrect. Such a configuration can raise interest in predictions about particular events.

Also, the avatar manager 43 can be configured to display a specific image including the user's avatar and the avatar of another user selected by the user, and to change the display mode of the specific image according to the value of a specific parameter based on at least the action of the selected user. For example, the avatar manager 43 is configured to present a screen displaying a specific image including the user's avatar and the avatar of the selected other user to the user and/or the selected other user (such as transmitting the screen data for that screen, etc., to the user terminal 30), and that screen is configured so that the display mode of the specific image changes according to the value of that specific parameter. In this case, the specific parameter includes information about the familiarity between the user and the selected other user. This familiarity information typically increases in response to actions involving communication between the user and another user, and can be updated by the parameter updating component 45. Such a configuration can lead to more communication among users.

Next, a specific example of the avatar management system 10 in this embodiment having such a function will be described. The system 10 in this specific example provides a SNS in which avatars are used. FIG. 3 shows an example of information managed by the user management table 411 in this specific example. As shown in the drawing, the user management table 411 in this example manages "user basic information" including nicknames and the like that are associated with a "user ID" that identifies an individual user, "avatar information" that is information about the user's avatars, "possessed item information" that is information about items possessed by the user, "familiarity information" (specific parameter) that is information about familiarity with other users, "prediction information" that is information about the user's prediction of a particular event, and other such information. For the user basic information, information provided by the user, etc., is set at a point such as when a new user account is created, and is updated as needed thereafter.

Avatar information includes information about the avatar item that is applied to the avatar. These items include items to be worn by the avatar (costumes, etc.), items to be arranged in the foreground or background of the avatar, items for putting the avatar in a particular orientation or making the avatar perform a particular motion, and the like. As will be described in detail below, the user can select a desired item from among the avatar items he possesses and apply it to his avatar.

The possessed item information includes information for identifying the items possessed by the user (such as item IDs). The user can acquire items for a fee or at no charge at various opportunities. For instance, the user acquires an item for a fee or via a lottery at no charge, or acquires an item as a reward for achieving a specific mission in the SNS (such as a mission to log in everyday), or acquires an item by purchasing it with virtual money (coins, points, etc.). Items include avatar items that can be applied to an avatar, as well as greeting items used for executing "greetings" (discussed below).

Familiarity information is information about familiarity to each of a plurality of other users, and is updated according to actions involved in communication between users. For example, familiarity information increases in response to chats between users and the execution of "greetings." As will be discussed in detail below, a "greeting" is an action in which a greeting image (specific image) including the user's own avatar and the selected other user's avatar is sent to the selected other user over the SNS.

Figures 4, 5:
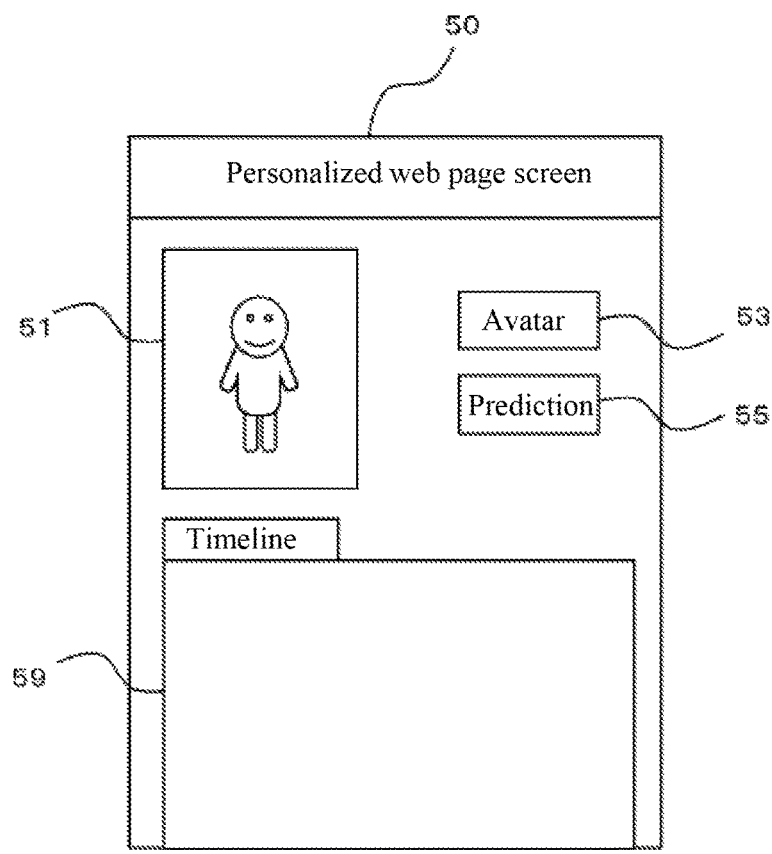
FIG. 4 An example of the information managed by a parameter management table 412.
FIG. 5 An example of a personalized web page screen 50.

FIG. 4 shows an example of information managed by the parameter management table 412 in this specific example.

As shown in the drawing, the parameter management table 412 in this example manages information such as the "number of provisions" (specific parameter) of a special item to all of a plurality of users, in association with a "special item ID" that identifies individual particular items. In this example, the special items are avatar items that can be applied to an avatar, and are provided to the user via a lottery ("gacha"). That is, the number of provisions of special items can also be called the number of special items won. The special item "gacha" is provided, for example, as a limited time "gacha." The number of provisions is incremented each time a corresponding special item is provided (won).

FIG. 5 shows an example of the personalized web page screen 50 displayed on the user terminal 30. For example, the screen 50 is displayed at the point when the personalized web page menu is selected on the top screen of the SNS provided by the system 10. As shown in the drawing, the personalized web page screen 50 has an avatar display area 51 for displaying the user's own avatar, an avatar management button 53 displayed as "avatar," a prediction button 55 displayed as "prediction," and a timeline display area 59. In the timeline display area 59 are displayed content posted by other users in the SNS, content conveying the actions of other users, and content such as advertisements. Content related to another user is displayed along with a user icon corresponding to the avatar of that other user.

Figure 6:
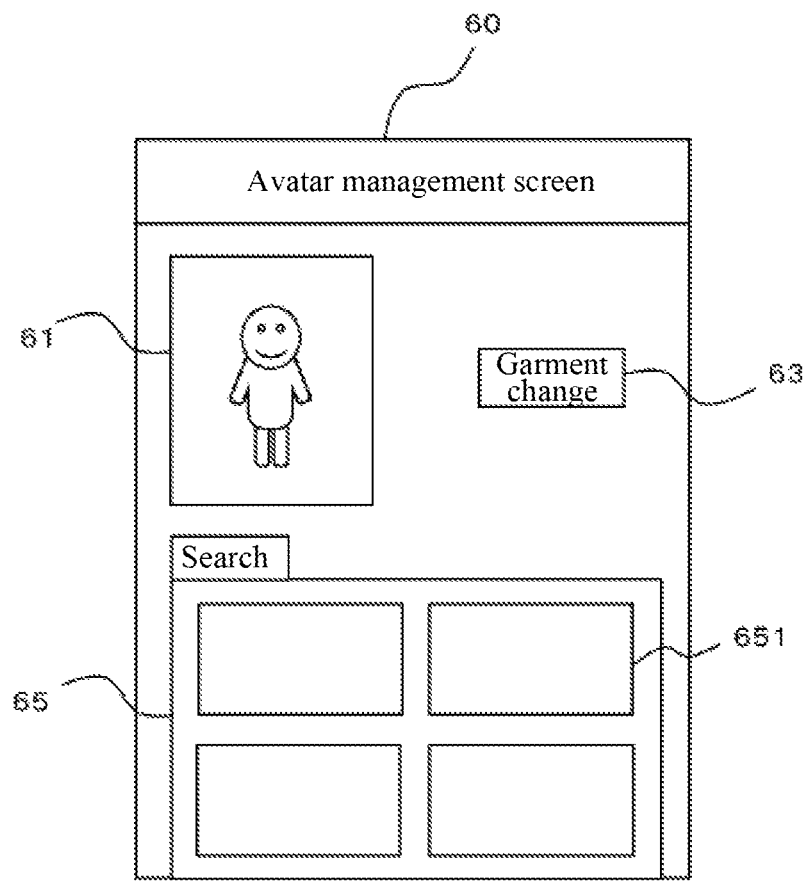
FIG. 6 An example of an avatar management screen 60.

When the user selects the avatar management button 53, the avatar management screen 60 shown as an example in FIG. 6 is displayed. As shown in the drawing, the avatar management screen 60 has an avatar display area 61 for displaying the user's own avatar, a garment change button 63 displayed as "garment change," and a banner display area 65 for displaying a list of a plurality of banners 651 each linked to an item gacha. In this example, the item gacha is provided by a plurality of providers, and the user selects the banner 651 corresponding to the desired gacha (such as an avatar item gacha related to a desired character) from among the plurality of banners 651 listed in the banner display area 65. When the item gacha is executed and an item is acquired, the possessed item information in the user management table 411 is updated.

Figure 7:
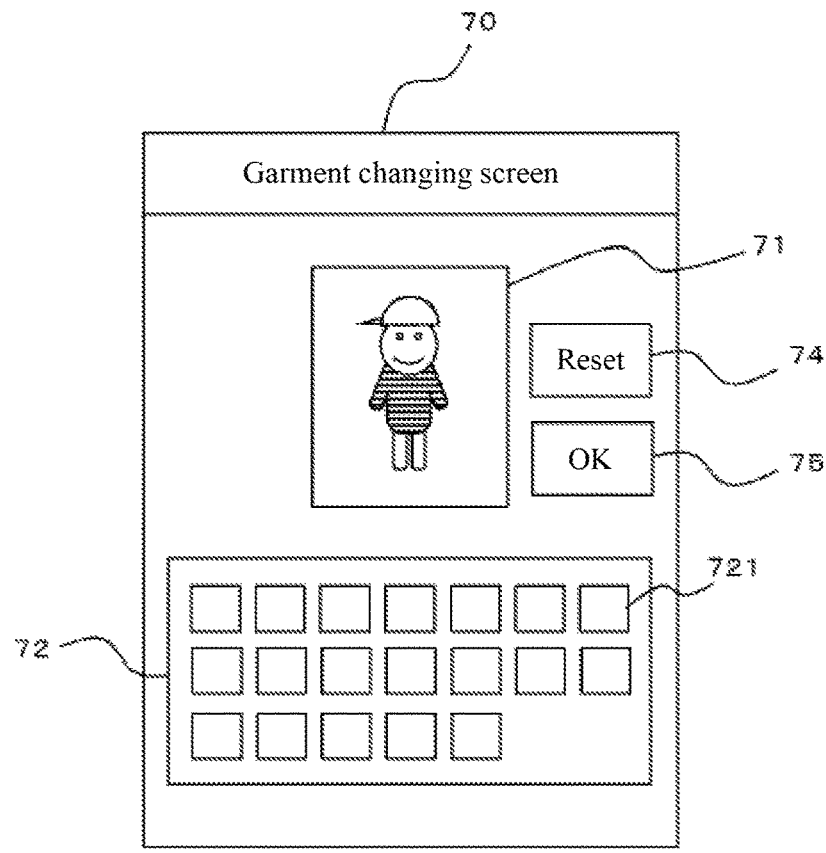
FIG. 7 An example of a garment changing screen 70.

When the user selects the garment change button 63, the garment changing screen 70 shown as an example in FIG. 7 is displayed. As shown in the drawing, the garment changing screen 70 has an avatar display area 71 for displaying the user's own avatar, an item display area 72 for displaying a list of avatar items 721 possessed by the user, a reset button 74, and an OK button 75.

When the user selects any of the avatar items 721 listed in the item display area 72, the application of the selected avatar item to the avatar is reflected in the avatar display area 71. When the user selects the reset button 74, the application of the item to the avatar via the item display area 72 is reset. In this way, the user can apply an avatar item to the user's own avatar (change the avatar's garments) via the garment changing screen 70. When the user selects the OK button 75, the application of the item to the avatar is confirmed and the avatar information in the user management table 411 is updated.

Figure 8:
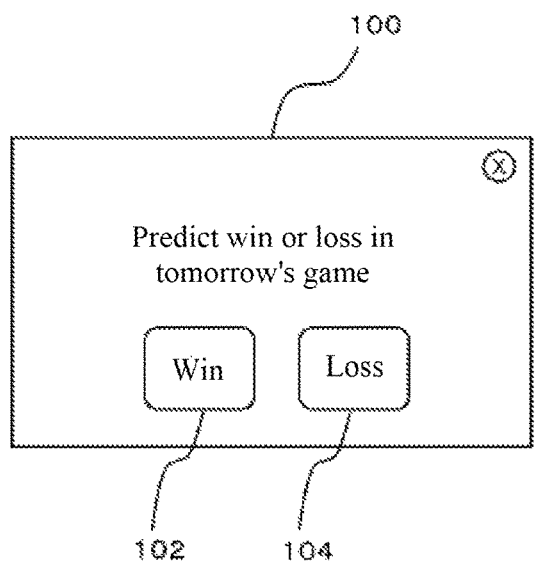
FIG. 8 An example of a prediction reception screen 100.

Returning to FIG. 5, when the user selects the prediction button 55 on the personalized web page screen 50, the prediction reception screen 100 shown as an example in FIG. 8 is displayed. The prediction reception screen 100 has a first button 102 displayed as "win," and a second button 104 displayed as "loss." The user selects either the first button 102 or second button 104 to predict a win or loss in a particular game to be played the next day (such as a professional baseball game). The prediction information in the user management table 411 is updated according to the prediction inputted via the prediction reception screen 100. In this example, the system 10 acquires the result of a particular game from the outside, and determines whether the predictions of the various users were correct or not based on the result.

Figure 9:
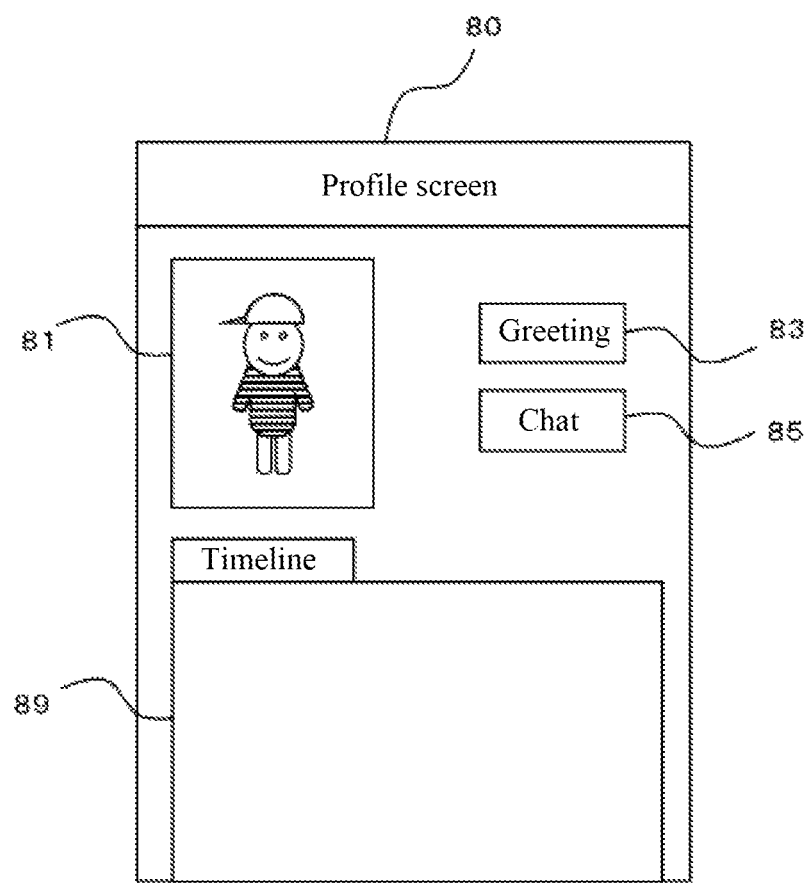
FIG. 9 An example of a profile screen 80.

FIG. 9 shows an example of a profile screen 80 displayed on the user terminal 30. The screen 80 is used for viewing information about other users (their profiles). Regarding the profile screen 80, when a particular user is selected through a user search function, for example, the profile screen 80 of that particular user is displayed, and when a particular user icon displayed on the timeline display area 59, etc., of the personalized web page screen 50 is selected, the profile screen 80 of the user corresponding to that particular user icon is displayed. As shown in the drawing, the profile screen 80 has an avatar display area 81 for displaying the avatar of the corresponding user, a greeting button 83 for executing a "greeting" to the corresponding user, a chat button 85 for exchanging text messages with the corresponding user, and a timeline display area 89 for displaying the timeline of the corresponding user.

Figure 10:
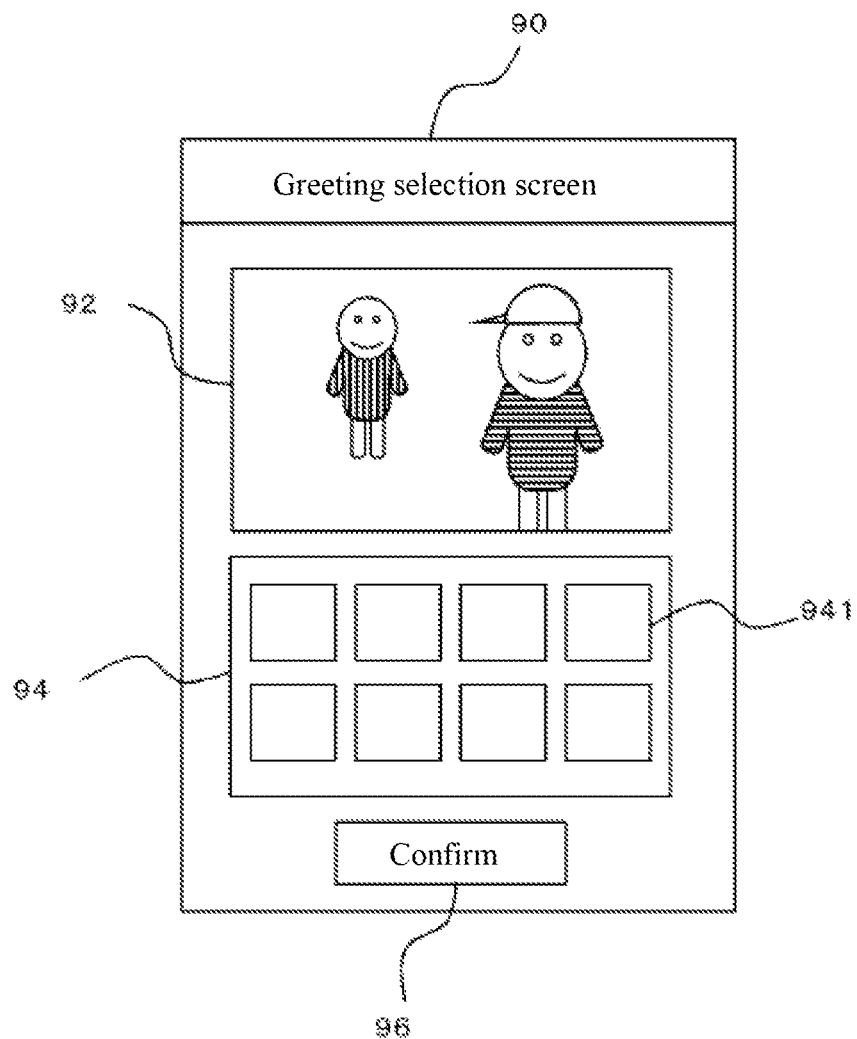
FIG. 10 An example of a greeting selection screen 90.

When the user selects the greeting button 83, the greeting selection screen 90 shown as an example in FIG. 10 is displayed. As shown in drawing, the greeting selection screen 90 has a greeting image display area 92, a greeting item display area 94 for displaying a list of greeting items 941 possessed by the user executing the "greeting" (the user who selected the greeting button 83), and a confirmation button 96. The greeting items are items that define the layout of the two avatars included in a greeting image (the avatars of the user executing a "greeting" and the user receiving it) in the image (their position, orientation, motion, etc.), and the foreground or background. When any of the plurality of greeting items 941 listed in the item display area 94 is selected, the greeting image to which that greeting item 941 is applied is displayed in the greeting image display area 92. More specifically, an image to which is applied the layout and the like defined by the selected greeting item 941, including the avatars of the user who executed the "greeting" and the user at whom it is aimed, is displayed in the greeting image display area 92. When the user selects the confirmation button 96, a "greeting" is executed, and the greeting image displayed in the greeting image display area 92 is sent to the user at whom the "greeting" is aimed. More specifically, the received greeting image is displayed in the timeline display area 59 of the personalized web page screen 50 of the user who has received the greeting image. Also, information about the familiarity between the user who executed the "greeting" and the user who received it is updated in response to the execution of the "greeting."

Here, the display mode of the avatar in this example will be described. Avatars are displayed in the respective avatar display areas 51, 61, 71, and 81 of the above-mentioned personalized web page screen 50, the avatar management screen 60, the garment changing screen 70, and the profile screen 80. The display of the avatar is carried out in a display mode based on the avatar item being applied.

Also, when a special item is applied, the display mode of the avatar changes according to the number of provisions of the special item. More specifically, the display mode of the special item changes once the number of provisions of the special item reaches a specific value (such as 1000).

Figure 11:
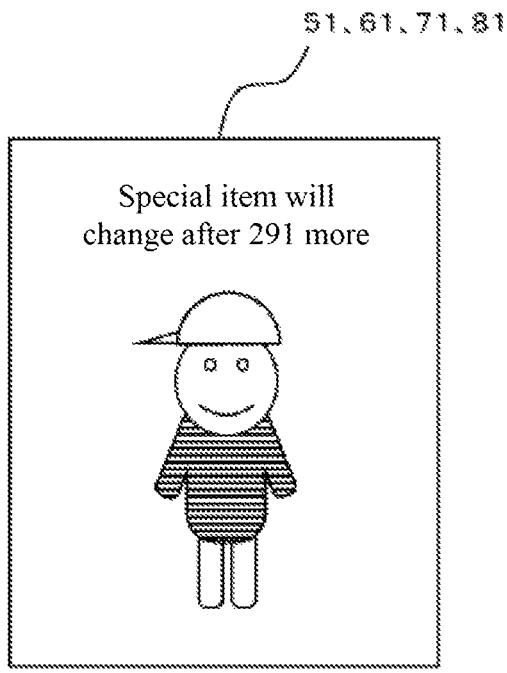
FIG. 11 Examples of avatar display areas 51, 61, 71, and 81 when a special item has been applied to an avatar.

FIG. 11 shows and example of the avatar display areas 51, 61, 71, and 81 when a special item is applied to the avatar.

In the example in FIG. 11, the special item is an avatar item constituting the entire avatar background. FIG. 11 shows the state before the number of provisions of the special item reaches a specific value; in this case, as shown in the drawing, a character string indicating the remaining number until the number of provisions of the special item reaches a specific value is displayed (that is, the remaining number until a specific value of the number of provisions is displayed as a countdown).

Figure 12:
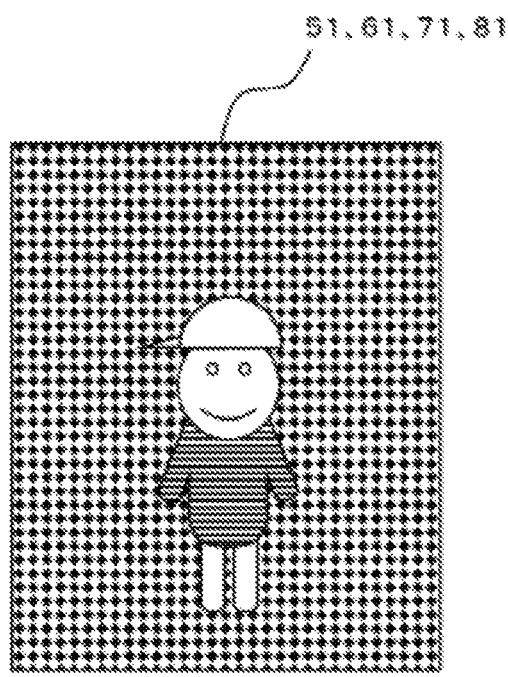
FIG. 12 Examples of the avatar display areas 51, 61, 71, and 81 when a special item has been applied to an avatar.

FIG. 12 shows an example of the avatar display areas 51, 61, 71, and 81 when the number of provisions of the special item has reached a specific value. In this case, the display mode of the entire avatar background (including color, pattern, visual effects, and so forth) changes as shown in the drawing. Thus, the display mode of an avatar to which a special item has been applied changes when the number of provisions reaches a specific value. Therefore, a user who has applied a special item to his avatar will be more interested in the acquisition of special items by other users, and will encourage other users to acquire special items, for example. As a result, social connectivity in the SNS can be improved.

Also, a greeting image including an avatar will change to a different display mode depending on information about familiarity between users. More specifically, at least part of the layout and foreground or background defined by the greeting item in a greeting image will change depending on information about familiarity between users. More specifically, the display mode of the greeting image changes when the number of times a "greeting" is executed between users reaches a specific value (such as 100 times), for example. Therefore, the user will be more interested in increasing familiarity information with other users, and the execution of "greetings" will be encouraged, for example. As a result, social connectivity can be improved in the SNS.

In the example described above, the display mode of the avatar changed according to the number of provisions of a special item, but in another specific example of this embodiment, the configuration may be such that the display mode changes according to the number of users who possess a special item. Also, the display mode of the avatar may change depending on the number of users who have applied a special item to their avatars. The number of users possessing a special item and the number of users who have applied that item can be managed in the parameter management table 412.

Also, in the above example, instead of changing the display mode of the avatar according to the number of provisions of a special item, or in addition to this, the display mode of the avatar may change according to the number of users who predicted a win or loss of a particular game inputted via the prediction reception screen 100. For example, when the prediction of a user is correct, the display mode of the avatar may change according to the number of users who similarly predicted correctly. The number of users who made a particular prediction can be managed in the parameter management table 412. In another specific example of this embodiment, the configuration can be such that the display mode of the avatar changes according to the number of users who executed a variety of actions other than "predicted a particular game." Such a configuration encourages a plurality of users to perform the same action, and social connectivity in the SNS can be improved.

Also, in the above example, instead of changing the display mode of a greeting image according to familiarity information between users, or in addition to this, some of the greeting items may be provided as special items, and the display mode of the greeting images may change according to the number of provisions of those special items (or the number of users possessing them, etc.).

In a specific example of this embodiment, a change to the display mode of the avatar according to the value of other parameters may be performed in addition to a change in the display mode of the avatar according to the value of a parameter based on the actions of other users (the number of provisions of special items, familiarity information, etc.). For instance, an avatar item may be applied whose display mode changes over time. In this case, for example, the configuration can be such that the display mode of the avatar to which that avatar item has been applied changes in stages (such as daily) within a specific time period (such as the last few days until Christmas).

The avatar management system 10 pertaining to this embodiment described above displays an avatar in a display mode based on the item that has been applied, but changes the display mode of the avatar according to a specific parameter value (such as the number of provisions of special items, and familiarity information, etc.) based on at least the actions of other users, so this helps prevent users from losing interest in the avatar compared to when the display mode changes only in response to an action by the user himself.

The processing and procedures described in this Description can be realized not only by what was explicitly described, but also by software, hardware, or any combination thereof. For example, the processing and procedures described in this Description can be realized by installing a logic device corresponding to the processing and procedures in an integrated circuit, a volatile memory, a nonvolatile memory, a magnetic disk, or another such medium. Also, the processing and procedures described in this Description may be realized as a computer program (e.g., non-transitory computer readable medium having instructions for performing managing the avatars of each of a plurality of users) corresponding to these processing and procedures, which can be executed by various kinds of computers.

The processing and procedures described in this Description are described as being executed by a single device, piece of software, component, or module, but such processing and procedures can instead be executed by a plurality of devices, a plurality of pieces of software, a plurality of components, and/or a plurality of modules. Also, the elements of the software and hardware described in this Description may be combined into fewer constituent elements, or can also be realized by dividing them up into more constituent elements.

In this Description, whether the constituent elements of the invention are described as being either singular or plural, or whether they are described without limiting them to either singular or plural, these constituent elements may be either singular or plural, except when they should be construed otherwise based on the context.

DESCRIPTION OF THE REFERENCE NUMERALS 10 avatar management system
20 network
30 user terminal
41 information storage manager
411 user management table
412 parameter management table
42 service provision controller
43 avatar manager
45 parameter updating component
50 personalized web page screen
60 avatar management screen
70 garment changing screen
80 profile screen
90 greeting selection screen
100 prediction reception screen

The invention claimed is:

1. A system for managing the avatars of each of a plurality of users, comprising one or more computer processors, wherein the one or more computer processors, in response to the execution of a readable command, are configured to perform:
    processing to apply an item selected from among items possessed by the user, to the user's avatar,
    processing to display the avatar in a display mode based on at least the item that has been applied, and
    processing to update a specific parameter based on at least the actions of other users,
    wherein the actions of the other users are related to a special item,
    wherein the specific parameter is managed in association with the special item, and
    the processing to display the avatar includes changing the display mode of the avatar according to the value of the specific parameter when the user has applied the special item to the avatar.

2. The system according to claim 1, wherein the specific parameter includes the number of provisions of the special item to the plurality of users.

3. The system according to claim 1, wherein specific parameter includes the number of users who possess the special item.

4. The system according to claim 1, wherein the specific parameter includes the number of users who have applied the special item to their avatar.

5. The system according to claim 1,
    wherein the specific parameter is the number of users who have executed a particular action, and
    the processing to display the avatar includes changing the display mode of the avatar according to the number of users who have executed the particular action when the user is executing the particular action.

6. The system according to claim 5,
    wherein the one or more computer processors further execute processing to receive from the user a prediction about a particular event, and processing to judge whether or not the prediction received from the user is correct, and
    the particular action includes a particular prediction about the particular event.

7. The system according to claim 6, wherein the processing to display an avatar includes changing the display mode of the avatar according to the number of users who have performed the particular prediction when the particular prediction executed by the user was correct.

8. The system according to claim 1, wherein the processing to display an avatar includes displaying specific images including the avatar of the user and the avatars of other users selected by the user, and changing the display mode of the specific images according to the value of the specific parameter based on at least the actions of the selected other users.

9. The system according to claim 8, wherein the specific parameter includes information about the familiarity between the user and the other selected users.

10. A method executed by one or more computers for managing the avatars of each of a plurality of users, said method comprising:

applying an item selected from among the items possessed by the user to the user's avatar;

displaying the avatar in a display mode based on at least the item that has been applied; and updating a specific parameter based on at least the actions of other users, wherein the specific parameter comprises a number of users that have executed a particular action, wherein the step of displaying the avatar comprises displaying the avatar in a first display mode according to the value of the specific parameter when the user is executing the particular action, and a second display mode that differs from the first display mode when the user is not executing the particular action.

11. The method according to claim 10, wherein the specific parameter is a parameter based on at least the actions of other users related to a special item, and the processing to display the avatar includes changing the display mode of the avatar according to the value of the specific parameter when the user has applied the special item to his avatar.

12. The method according to claim 11, wherein the specific parameter includes the number of provisions of the special item to the plurality of users.

13. The method according to claim 11, wherein specific parameter includes the number of users who possess the special item.

14. The method according to claim 11, wherein the specific parameter includes the number of users who have applied the special item to their avatar.

15. The method according to claim 10, wherein the one or more computer processors further execute processing to receive from the user a prediction about a particular event, and processing to judge whether or not the prediction received from the user is correct, and the particular action includes a particular prediction about the particular event.

16. The method according to claim 15, wherein the processing to display an avatar includes changing the display mode of the avatar according to the number of users who have performed the particular prediction when the particular prediction executed by the user was correct.

17. The method according to claim 10, wherein the processing to display an avatar includes displaying specific images including the avatar of the user and the avatars of other users selected by the user, and changing the display mode of the specific images according to the value of the specific parameter based on at least the actions of the selected other users, and wherein the specific parameter includes information about the familiarity between the user and the other selected users.

18. A non-transitory computer readable medium having instructions for performing managing the avatars of each of a plurality of users, including a processor and a storage, wherein, when the instructions are executed by one or more computers, and comprise:

processing to apply an item selected from among the items possessed by the user to the user's avatar;

processing to display the avatar in a display mode based on at least the item that has been applied; and processing to update a specific parameter based on at least the actions of other users, the specific parameter comprising a number of users that executed a particular action, wherein the processing to display the avatar includes displaying the avatar in a first display mode according to the value of the specific parameter when the user is executing the particular action, and displaying the avatar in a second display mode that differs from the first display mode when the user is not executing the particular action.

* * * * *